United States Patent [19]
Chlumecky

[11] 3,768,267
[45] Oct. 30, 1973

[54] TELESCOPING LINING AND SUPPORT STRUCTURE AND METHOD FOR LINING TUNNELS AND SHAFTS

[75] Inventor: Nicholas Chlumecky, Poland, Ohio
[73] Assignee: Commercial Shearing & Stamping Company, Youngstown, Ohio
[22] Filed: Oct. 13, 1971
[21] Appl. No.: 188,964

Related U.S. Application Data
[62] Division of Ser. No. 101,875, Dec. 28, 1970.

[52] U.S. Cl. .................................. 61/45, 61/84
[51] Int. Cl. ................. E21d 11/05, E21d 11/08
[58] Field of Search ................. 61/45, 84, 85, 16

[56] References Cited
UNITED STATES PATENTS
1,809,513  6/1931  Finkbeiner .................. 61/16 X
1,819,426  8/1931  Ladd ............................. 61/45
2,841,297  7/1958  Washabaugh ............. 61/45 X Primary Examiner—Jacob Shapiro
Attorney—Buell et al.

[57] ABSTRACT

A novel telescoping lining and support structure and method for lining tunnels and shafts is provided in which a plurality of first chordal segments are drawn into a tunnel or shaft hole in a reduced diameter state of compression, expanded diametrically one after another in place in said tunnel or shaft and keyed in the expanded state by a second smaller chordal segment which completes an annular ring segment with the first chordal segment in place.

4 Claims, 18 Drawing Figures

PATENTED OCT 30 1973 3,768,267
SHEET 1 OF 3
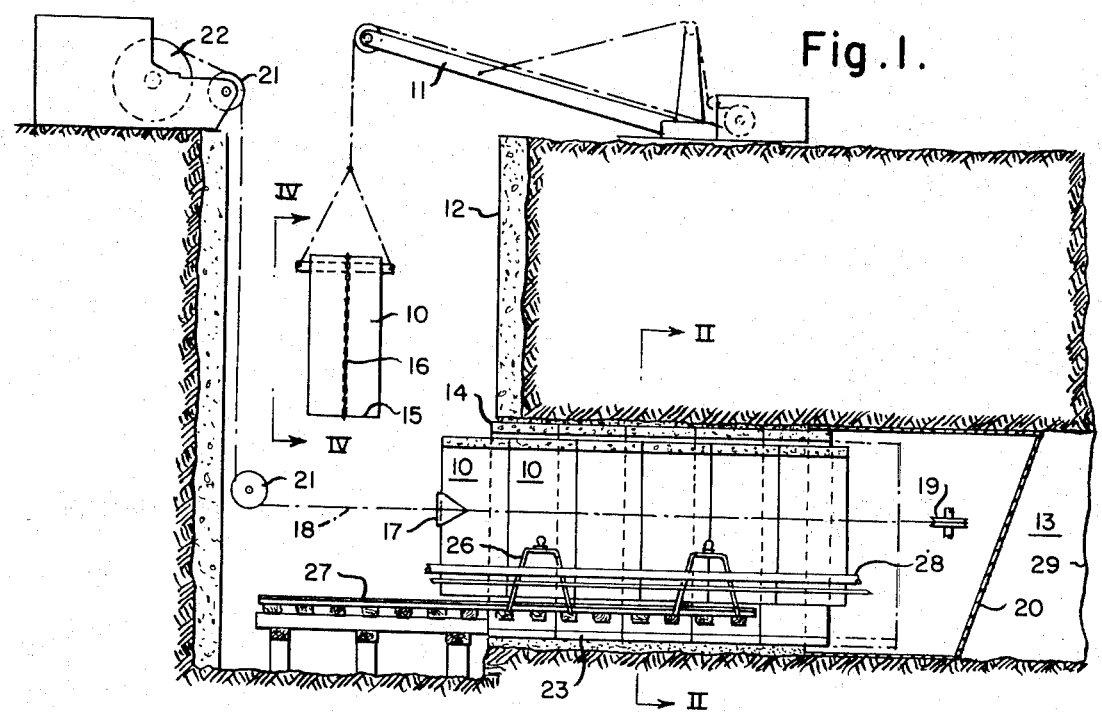
Fig. 1.
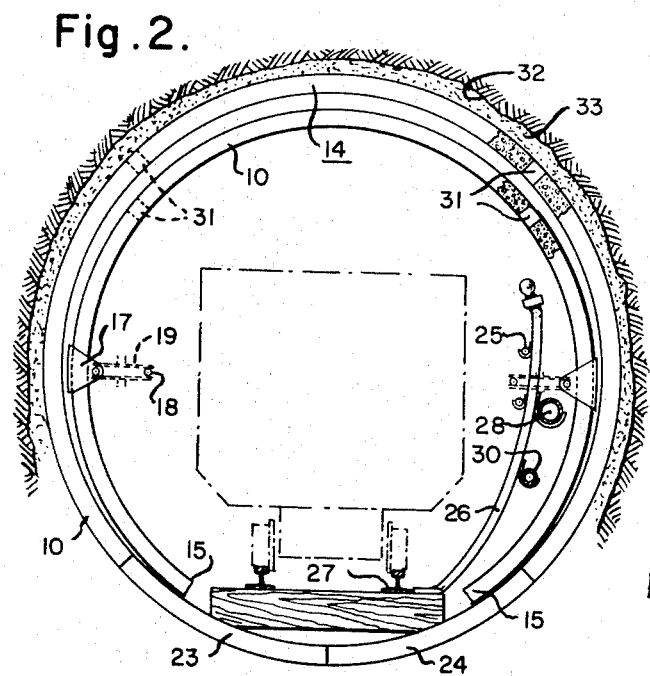
Fig. 2.
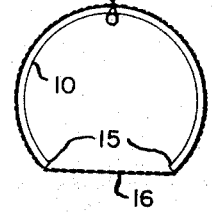
Fig. 4.
Fig. 3.

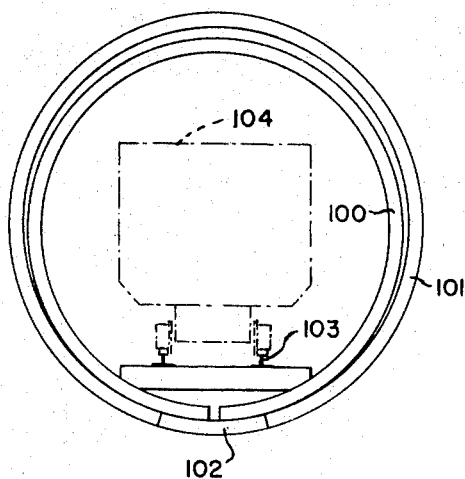
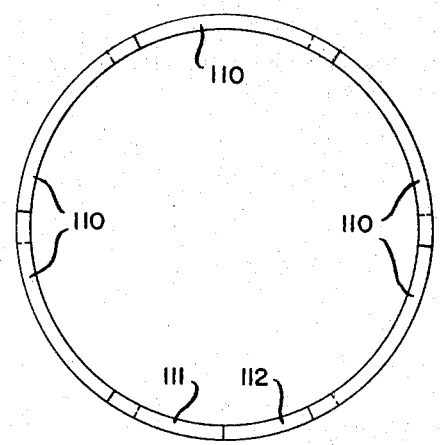
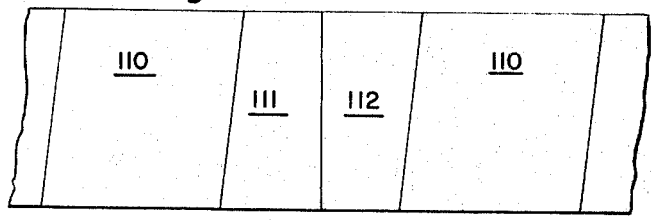
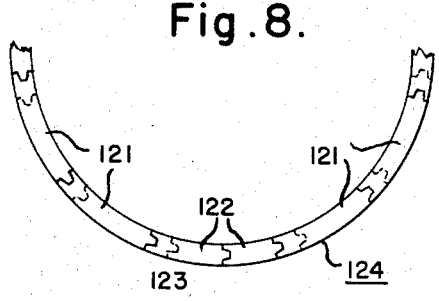
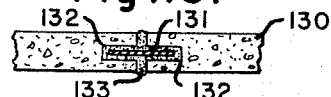
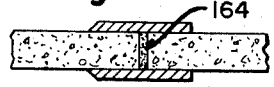
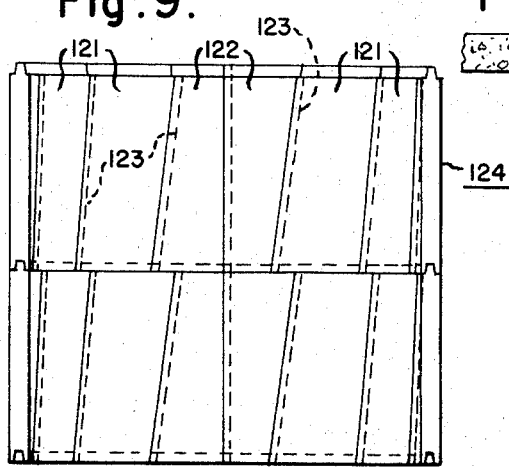
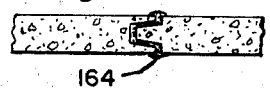
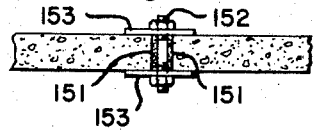

PATENTED OCT 30 1973 3,768,267

TELESCOPING LINING AND SUPPORT STRUCTURE AND METHOD FOR LINING TUNNELS AND SHAFTS

This invention relates to a telescoping lining and support structure and method for lining tunnels and shafts and particularly to a much improved method of supporting and lining tunnels and shafts which are made by mining and tunneling methods.

Underground tunnels and shafts, such as vehicular tunnels, underwater tubes, sewer and pollutant control tunnels, subways and similar structures must be provided with a supporting lining. The quicker the tunnel can be lined and completed for the support of surrounding earth and exclusion of water, the better. One method of accomplishing this uses concrete pipe which is jacked with heavy pressure into the earth by means of substantial hydraulic jacks which must abut against a very strong base or wall which is usually located in a shaft because such jacking would be difficult if the pipe has to be pushed from a structure on a flat surface. As the pipe is pushed ahead, earth is excavated at the front end of the tunnel ahead of the pipe which is then moved ahead. Besides the difficulty of requiring heavy jacking equipment, the pipe which is being jacked ahead must be lubricated on the outside usually by drilling holes from the surface and by injecting a mixture of water and bentonite. Drilling of the injection holes is costly because it must be done at relatively close intervals and because it interferes often with utilities and right of way on surface in congested city locations. Another disadvantage of the present method of pipe jacking is that it requires specially favorable conditions in relation to the earth through which the pipe is to be jacked. If the tunnel has to be driven through earth which contains many boulders or rock, or if the earth settles forcefully on the jacked pipe, due to labor delays or other factors such as insufficient bentonite lubrication, any further tunneling by pipe jacking becomes impossible and tunneling can then only proceed by methods other than pipe jacking. Another problem is that at times due to the heavy jacking load, pipe components break up and require their removal with costly repair. While pipe jacking is successful in suitable locations in earth, it is limited in range since the jacking thrust can move but a limited lineal footage of pipe. When load or drag, despite lubrication of the outside wall of the pipe, increases to a point where the pipe may be damaged by the pressure applied, the jacking must be discontinued. Furthermore, most accurate aligning of the jacked pipe must be observed and maintained because misalignment will cause complete seizure and stoppage of the pipe being jacked making any further tunnel advance imposible with this method. Another problem is the handling of power cables, ventilation ducts and other utilities which have to be carried forward to the working face of the tunnel. The pipe elements which are jacked into the earth have to be placed against the last element which was pushed in. In order to join the next pipe element, all above utility lines and often also the track for cars which haul out the excavated earth have to be disconnected and after placing the pipe element all these utilities have to be reconnected before the tunnel advance can be resumed. In summary, the present art of pipe jacking in tunneling is subject to many hazards, laborious efforts, high costs and considerable limitations.

The present invention provides a novel and signifcant improvement over the presently used method which was described above. In addition the invention provides a tunnel lining which can be telescoped through the installed lining without the need for heavy jacking members which require a strong abutment. The tunnel lining of the present invention does not require costly drilling methods for the injection of lubricating matter to the outside of the tunnel lining. Furthermore this invention provides a telescoping tunnel lining which does not depend on specially favorable earth formations through which the tunnel is mined and which is not affected by work stoppages or other delays which cause seizure of a moving lining. The present tunnel lining can be telescoped towards the tunnel face without exerting excessive and damaging pressures on lining components as they are moved ahead. Moreover the present invention provides a lining which does not require a large shaft from which the tunnel can be started. The lining of the present invention can be moved into the tunnel without a need to disconnect and reconnect utility lines, ventilation pipes and track.

The present invention provides a method of lining a tunnel in which a plurality of first or primary chordal segments are drawn into a tunnel in the compressed state, expanded one after another in place and keyed by a smaller second chordal segment to form an annular segment in place. Preferably the segments are provided with grout holes through which grout is pumped to fill the void behind the segments. The segments are moved into place by drawing with a cable, by means of hydraulic cylinders or by other equivalent means. The segments may be made of any strong elastic material such as steel, reinforced plastic, reinforced concrete or the like material. The first chordal segments preferably form an included angle greater than 230°.

In the foregoing general description I have set out certain objects, advantages and purposes of my invention. Other advantages and purposes of this invention will be described hereafter and will become apparent to those who are skilled in the art of tunneling when considering the following description with accompanying drawings in which:

FIG. 1 is a longitudinal section through a tunnel embodying my method for telescoping a lining into a tunnel;

FIG. 2 shows the cross-section of the tunnel on the line 11—II showing the manner in which the lining is telescoped and where the lining upon expansion and completion consists of three pieces per ring;

FIG. 3 shows an elevational view of the tunnel track with support frame for carrying utility lines;

FIG. 4 is an end elevational view of a telescoping lining member of FIG. 1 in compressed condition for insertion in a tunnel; taken on line IV—IV of FIG. 1;

FIG. 5 shows a cross-section of a second embodiment of telescoping lining where the track is contained by the telescoping lining and where each ring consists of two pieces;

FIG. 6 shows a fragmentary cross-section of a third embodiment of lining according to my invention;

FIG. 7 shows a plan view of trapezoidal shaped bottom segments of tunnel lining with square joints used in the embodiment of FIG. 6;

FIG. 8 shows a fragmentary cross-section of trapezoidal shaped bottom segments upon assembly with joints which have a tongue and groove configuration;

FIG. 9 is a plan view of the trapezoidal shaped bottom segments of the embodiment of FIG. 7;

FIG. 10 shows a cross-section of a spline joint which could be used instead of other joint configurations of this invention;

FIG. 11 illustrates a cross-section of another type of joint assembly of this invention;

FIG. 12 depicts a cross-section of a joint with asymmetrical keeper and seal of this invention;

FIG. 13 shows a cross-section of a tongue and groove joint of this invention;

FIG. 14 illustrates a cross-section of a joint with an H-section as a stabilizer to keep edges in line;

FIG. 15 shows an assembly with square edge with bolt and washer assembly to keep edges of joints in exact alignment;

Figure 17:
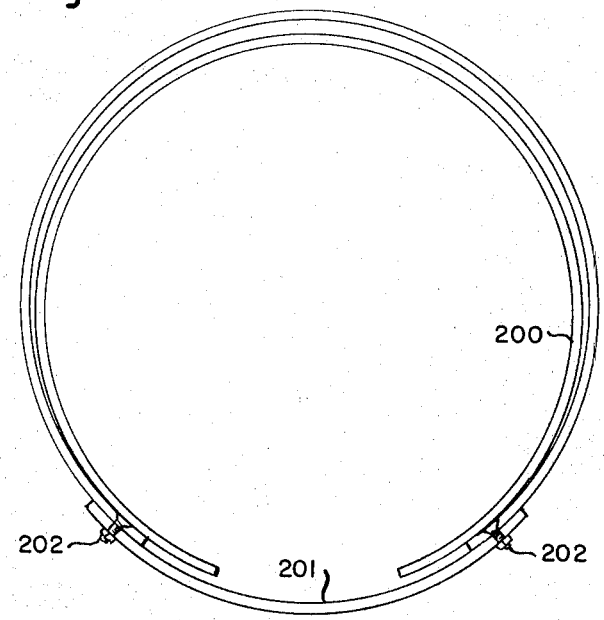
FIG. 17 is another embodiment of my invention shown in end elevation.

Referring to FIG. 1, I have shown a general arrangement of the telescoping tunnel lining installation showing an arcuate first chordal or primary segment 10 being lowered by crane 11 into vertical shaft 12 in front of horizontal shaft 13. Segment 10 is joined to other segments 10 already inserted within assembled lining 14 by drawing together temporarily lower ends 15 with cable or chain 16 as shown by FIG. 4 showing cross-section of segment being lowered into shaft 12. Once segment 10 is inserted within tunnel lining 14 temporary cable 16 is removed. Clamp 17 is then fastened to the trailing edge of segment 10. Clamps 17 are attached to cables 18 which run over sheave 19 which is mounted on shield 20. Cables 18 run out inside tunnel lining 14 to sheaves 21 and double drum winch 22. As the installation of tunnel lining 14 proceeds, segments 10 are pulled ahead within shield 20 and expanded and assembled with second segments 23 and 24 which complete the bottom of tunnel lining 14. Power lines 25 are carried by frames 26. Frames 26 are bolted to track 27. In shaft 12, power lines 25 run under track 27 so that they will not interfere with the lowering and insertion of segment 10 within tunnel lining 14. Frames 26 can then be used also to carry ventilation pipe 28 to the working face 29 of the tunnel.

FIG. 2 shows a cross-section of the telescoping lining arrangement of FIG. 1 and particularly the manner in which the various elements of the invention are related to each other. It shows how segment 10 which may consist of strong elastic material such as steel, reinforced plastic or reinforced concrete is located and held confined within upper expanded lining segment 10 and bottom lining segments 23 and 24. It shows also how frame 26 which carries power lines 25 as well as piping 30 and ventilation line 28 is fastened to track 27. Segments are furnished with grout holes 31 to fill the void between limits of tunnel excavation 32 with grout 33. Telescoping segments 10 are pulled into tunnel by clamp 17 which is attached to winch cables 18 that run over sheave 19 which is attached to tunnel shield.

In FIG. 5 I have illustrated a method of telescoping segments 100 with maximum circumference into completed tunnel lining 101 such that only one key segment 102 is required upon expansion of segment 100 to the diameter of tunnel lining 101. For this method, track 103 has to rest on segment 100. This method of telescoping is suitable for relatively small diameter tunnels where the weight of muck car 104 is not excessive.

In the embodiment of FIG. 7 I show a plan view of parallelogram shaped segment 110 and trapezoidal shape segment 111 suitably shaped for installation of trapezoidal segment 112 so that as the segments 110 and 111 are slid longitudinally, they will require a minimum of space ahead of completed portions of the lining. FIG. 6 shows how the assembled segments are arranged as related to a fragmentary view of the lining cross-section.

In the embodiment of FIG. 9 I show a plan view of the parallelogram segments 121 and two trapezoidal segments 122 with tongue-and-groove shaped joint 123 to assure proper alignment of segments through their joints. FIG. 8 shows a fragmentary cross-section of telescoping segment in relation to assembled lining 124.

FIG. 10 to FIG. 16 describe various joints which could be suitable for use with the telescoping lining 130. FIG. 10 is a spline joint with spline 131 inserted in grooves 132. For sealing groove 132 could be filled with sealant material 133 which forms a bond between spline 131 and lining 130.

FIG. 15 shows square joints 151 held in alignment during assembly by means of temporary bolts 152 and washers 153.

Figure 16:
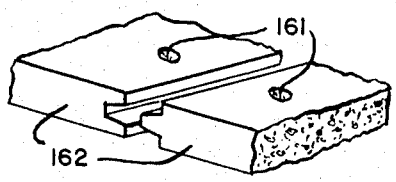
FIG. 16 shows tongue-and-groove joint with holes for temporary use to draw longitudinal or vertical joints together.

FIG. 16 shows a fragmentary plan view of a tongue-and-groove joint before it is drawn together. As a means of drawing the joint together, holes 161 are drilled through lining 162. Dowels (not shown) are then inserted temporarily in hole 161 to draw the joint together with a clamp (not shown).

FIGS. 10 to 16 show also locations of sealing or bonding material 164 which may consist of epoxy or other suitable compounds.

Figure 18:
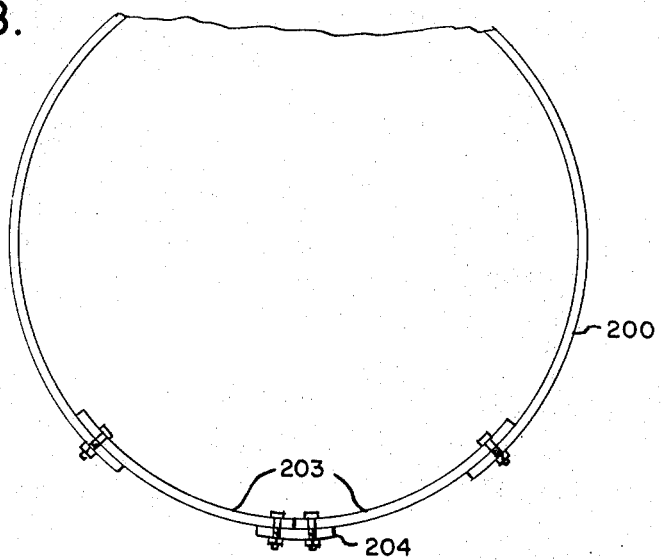
FIG. 18 is still another embodiment of my invention in end elevation.

FIGS. 17 and 18 show other embodiments in which a segment 200 is passed through the lined tunnel and expanded and fastened to an overlapping bottom member 201 by bolts 202 or alternatively by bottom segments 203 and splice plate 204.

In the foregoing specification I have set out certain preferred embodiments of my invention; however, it will be understood that this invention may be otherwise embodied within the scope of the following claims.

I claim:

1. A tunnel lining segment comprising a primary arcuate segment of finite length having an included angle of at least 230° but less than 360° and formed of a material having limited elastic properties such that the segment can be diametrically compressed a sufficient amount to permit its passage through a like segment diametrically uncompressed and at least one secondary segment adapted to engage the primary segment at its ends and forming with said primary segment an included angle of 360°.

2. A tunnel lining segment as claimed in claim 1 made of steel.

3. A tunnel lining segment as claimed in claim 1 made of reinforced plastic.

4. A tunnel lining segment as claimed in claim 1 made of reinforced concrete.

\* \* \* \* \*